United States Patent Office 3,495,991
Patented Feb. 17, 1970

3,495,991
METHOD OF PRODUCING A SEASONING
Koya Mogi and Seizi Kitahara, Noda-shi, and Danji Fukushima, Yono-shi, Japan, assignors to Kikkoman Shoyu Co., Ltd., Noda-shi, Chiba-ken, Japan
No Drawing. Filed Apr. 22, 1966, Ser. No. 544,397
Claims priority, application Japan, Apr. 27, 1965, 40/24,908; Apr. 16, 1966, 41/23,796
Int. Cl. A23l 1/22
U.S. Cl. 99—145          8 Claims

ABSTRACT OF THE DISCLOSURE

A soy sauce seasoning is made by first preparing an aqueous liquid medium of high concentration but low viscosity by mixing carbohydrates with a vegetable protein-containing extract made by extracting protein-containing grains, or protein-containing portions thereof, with water or an aqueous alkaline solution. The total nitrogen concentration is 0.5 to 2.5 grams per 100 ml. of the medium. The viscosity and pH of the medium are so adjusted as to make possible the submerged culture under aerobic conditions of fungi of the genus Aspergillus known to be suitable for the making of conventional soy sauce and a pure culture of such fungi is then introduced into the medium. After the production of a large amount of Aspergillus mycelia, full autolysis of the mycelia is permitted under conditions preventing the intrusion of other microorganisms.

---

This invention relates to a method of producing a seasoning, and especially a soylike seasoning, wherein the complicated and disadvantageous defects involved in the conventional method have been surmounted, this being accomplished without the loss of the desirable aroma and flavor of the conventional product. More particularly, this invention relates to a method of producing a seasoning which is characterized by inoculating Aspergilli into a liquid medium of high concentration but low viscosity, which contains at least carbohydrates and an extraction liquid containing predominantly proteins, which has been obtained by extracting vegetable protein-containing materials with either water or an aqueous alkaline solution, and moreover whose total nitrogen concentration derived from said extraction liquid is 0.5–2.5 grams, and preferably 0.8–1.5 grams, per 100 ml. of the medium, and whose viscosity and pH have been adjusted so as to render possible the submerged culture in liquid medium of Aspergilli, effecting the submerged pure culture in liquid medium of said Aspergilli under aerobic conditions to obtain a culture medium containing a large quantity of Aspergillus mycelia, and thereafter effecting the autolysis of said mycelia under conditions wherein the intrusion of other microorganisms is prevented.

In producing soy sause heretofore, vegetable protein-containing materials and carbohydrates were used as the principal starting materials. These were treated by customary procedures, after which the mixture was inoculated with Aspergilli, and the solid culture thereof was carried out under open conditions to make the "koji." A soy mash was prepared from this solid koji by mixing it with a solution of common salt, which mash was then fermented by the activity of the naturally propagating and/or artificially inoculated microorganisms, principally soy lactic acid bacteria and soy yeasts, from which the soy sauce was obtained by removing the solids portion from the fermented mash.

However, in such a method of producing soy sauce, all of the starting materials used must go through numerous processing steps which require much labor and complicated treatments to obtain the solid koji, and as a result, the productivity of labor is reduced exceedingly. Furthermore, this process of producing the solid koji is not a pure culture and contamination by means of other microorganisms easily takes place, with the consequence that it becomes necessary to take steps for preventing the putrefaction of the mash. Hence, the presence of a high concentration of common salt is required from the beginning of the preparation of the mash, and this greatly hinders the enzymatic activity in the mash. As a result, this becomes the principal cause for prolongation of the brewage period excessively.

For preventing such a disadvantage, there is known a so-called "amino acid soy sauce," which has been made by a chemical method comprising decomposing the protein materials with hydrochloric acid without relying on the activity of microorganisms, and thereafter neutralizing the so decomposed materials with an alkali. The seasoning obtained by such a method has numerous defects with respect to such as its flavor and quality and hence it is a very unsatisfactory product even as a substitute for the brewed soy sauce such as hereinbefore described.

Thus, for retaining satisfactory aroma, flavor and quality, the utilization of the activity of the microorganisms cannot be dispensed with. On the other hand, if it is intended to utilize the activity of the microorganisms, there entail, as previously noted, numerous disadvantages and technical defects.

In order to surmount the disadvantages and defects of the conventional method wherein the activity of microorganisms is utilized, proposals have been made of providing soy sauce or soy-sauce like seasoning by carrying out the pure culture of Aspergilli in a medium. These proposals can be roughly classified into two types.

One type is the proposal of carrying out the pure culture of Aspergilli in a paste like medium of an order as can maintain the concentration required in a soy mash whose fermentation has been completed (a medium which contains the solids of vegetable protein-containing materials in a great quantity).

However, despite the fact that Aspergilli are in practically all cases aerobic in nature, the aeration and/or agitation of the medium such as to render it fit for the growth of Aspergilli cannot be performed fully and uniformly owing to the high viscosity of such a pastelike medium, which attends its high concentration. Hence, the full and uniform cultivation of Aspergilli is exceedingly difficult in this case, and the production of enzymes is also very low. In order to overcome the defects of this proposal which is not practicable, it is necessary to reduce the viscosity of the medium. But this is inevitably attended with a decrease in the concentration of the medium, and hence a liquid medium of the desired concentration cannot be obtained.

The other type of proposal is that wherein, for overcoming such difficulties as are involved in connection with the culture of Aspergilli, a liquid medium of exceedingly low concentration whose viscosity has been fully reduced is used, the pure culture of Aspergilli being carried out in this medium to prepare a liquid koji fully containing the enzymes which are produced by Aspergilli, after which this liquid koji is mixed with the principal starting materials of soy sauce, which have been either steamed or roasted and crushed by customary procedures, and thereafter the enzymatic decomposition of this mixture is carried out in a closed vessel in the absence of common salt and under conditions wherein the intrusion of other microorganisms is prevented.

However, even though it is possible according to this proposal to shorten the production period, as compared with that of the conventional brewed soy sauce, and there is moreover the merit that a fermented liquid of the desired concentration can be produced, the characteristic aroma and flavor of soy sauce or soylike seasoning cannot be obtained, because the multiplication of Aspergilli does not take place in the principal starting materials. Thus, there is another defect and a fatal one, that it is only possible to obtain a product whose quality is exceedingly unsatisfactory.

Further, if a fully anaerobic Aspergillus can be discovered, it might be possible to provide a practicable method even in the case of the former type of proposal. It is however difficult to obtain an anaerobic Aspergillus of the order as can be utilized commercially for carrying out its multiplication in such a medium of high concentration and high viscosity.

As a result of our researches with the end to overcome the mutually antagonistic and incompatible disadvantages of these two types of proposals and to provide a method which can provide the desirable aroma and flavor of the brewed soy sauce obtained by the conventional method and in which the numerous disadvantages from the production standpoint have been surmounted, we found that the reason why the soy sauce obtained by the latter type method lacked the characteristic aroma and flavor of soy sauce was attributable to the fact that in this method the formation of free glutamic acid was exceedingly small as compared with that in the case of the conventional method in which solid koji was used, and hence the principal taste-providing component was very sparse. Another reason was that the formation of the characteristic flavoring component did not take place, because of the fact that the multiplication of the Aspergilli was no carried out in the principal starting materials.

It was also confirmed that the principal causes for the sparseness of free glutamic acid in the case of the latter type method was not because the strain of Aspergilli used or the enzyme composition in the liquid koji used was different from that of the conventional soy sauce solid koji, nor because of the difference in the conditions of decomposition during the enzymatic decomposition of the materials, such as the difference in the temperature or pH, but the fact is that this depended on whether or not the multiplication of the Aspergilli takes place actively in the principal starting materials.

Further, we conducted basic experiments relative to such as the autolysis of Aspergilli to investigate the causes therefor, with the consequence that we discovered the fact that the Aspergilli multiplying in the starting materials of soy sauce accumulated glutamic acid within themselves and that thereafter the autolysis of the Aspergillus mycelia which took place played a major role in increasing the formation of free glutamic acid.

This being the case, we decided to utilize the latter of the aforesaid two types of methods and attempted to impart to the product thereof the aroma and flavor characteristic of the conventional brewed soy sauce by a compromise method by which the defects of this latter method was surmounted. This compromise method consisted of conducting the enzymatic decomposition by means of liquid koji, while at the same time the Aspergilli was multiplied in the pastelike product resulting from the foregoing decomposition, this being accomplished by giving a suitable amount of aeration and agitation to the pastelike product.

Considerable improvement was had in the aroma and flavor, inclusive of the point that free glutamic acid was formed, but a product which excelled in both aroma as well as flavor as compared with the product obtained by the conventional solid koji method was still difficult of obtaining. Again, in commercializing this method on a large scale, the previously noted difficulties could not be avoided, since the aerobic Aspergilli are multiplied in a concentrated pastelike product having a very high viscosity. Above all, in view of the fact that this difficult operation must be carried out in conjunction with the conditions wherein the intrusion of other microorganisms is completely excluded, the equipment required must be a unique one different from the conventional culture tanks. Thus, there arose numerous difficulties such as that increases in equipment expenses mounted and that operation was also not easy.

Therefore, we furthered our researches with the intent of providing a method whereby it would be possible to overcome the already mentioned numerous defects which were not even surmountable by the foregoing compromise method, and thus to produce a soy sauce or soylike seasoning having the characteristic desirable aroma and flavor of the brewed soy sauce which uses solid koji in accordance with the conventional method; and also whereby the production could be carried out promptly without the requirement for complicated adjustments requiring manual labor or the requirements for prolonged periods of production and supervision. In consequence, we found that a liquid medium for use in producing soylike seasoning could be provided, which was of high concentration but at the same time possessed a minimum viscosity, i.e., a liquid medium which possesses the two properties which were incompatible. We found that by utilizing a medium such as this the submerged culture of Aspergilli in liquid medium under aerobic conditions could be carred out with great advantage. It was thus found that the uniform and fully submerged culture of Aspergilli in the concentrated starting materials was made possible, with the consequence that a culture liquid containing a large amount of Aspergillus mycelia could be prepared, and that such a medium could be provided only by using an extraction liquid containing predominantly proteins which is obtained by extracting vegetable protein-containing materials with either water or an aqueous alkaline solution, the latter being especially preferred. Such a culture medium was completely neglected in the already mentioned prior art methods and their improvements.

We found further that this medium had to be one which contains at least the aforesaid extraction liquid and carbohydrates and moreover that the concentration in the medium of the total nitrogen derived from said extraction liquid must range between 0.5 and 2.5 grams, and preferably between 0.8 and 1.5 grams per 100 ml. of the medium, and as an inseparable and indispensable condition in connection with the use of a liquid medium of high concentration but low viscosity which satisfies such various conditions, that the culture liquid obtained by cultivation and containing a large amount of Aspergillus mycelia must go through an autolytic process until full autolysis of the mycelia in said culture liquid takes place under conditions wherein the intrusion of other microorganisms is prevented.

It is therefore an object of this invention to provide a method of preparing a seasoning, and especially a soylike seasoning, wherein the product obtained has the desirable aroma and flavor characteristic of the brewed soy sauce made by the conventional method; and in which the numerous unavoidable drawbacks attendant upon the preparation of soy sauce by the conventional brewing method are surmounted; and further in which the numerous unavoidable technical defects possessed by the various methods proposed as improvements with the intent of shortening the preparation period as well as the compromise method thereof are surmounted at a single stroke.

Other objects and advantages of this invention will be apparent from the following description.

First, in preparing a soylike seasoning in accordance with the invention method, the cultivation of Aspergilli is carried out in a medium of the starting materials, an important feature residing in the point that an extraction liquid whose utilization in a medium for preparing a soylike seasoning has never been proposed heretofore is used, i.e., an extraction liquid containing predominantly proteins which have been extracted from vegetable protein-containing materials with either water or an aqueous alkaline solution, the latter being especially preferred. A medium containing at least such an extraction liquid and known carbohydrates is used as the medium. Thus, it becomes possible to provide for the first time a liquid medium possessing high concentration but low viscosity. Further, it is necessary in this case to ensure that the concentration in the medium of total nitrogen derived from the aforesaid extraction liquid ranges between 0.5 and 2.5 grams, and preferably between 0.8 and 1.5 grams, per 100 ml. of the medium.

Needless to say, the pH of the medium is adjusted to a pH which is in the vicinity of the pH known to be most suited for the growth of the known Aspergilli to be used.

The vegetable protein-containing materials to be used in preparing the protein-containing extraction liquid are well-known to those skilled in the art. For example, the starting materials such as soybean, defatted soybean and wheat gluten can be used as such or can be used pressed or ground. In short, they are preferably used in a state suitable for accomplishing their extraction. Such starting vegetable protein-containing materials are extracted using water, usually hot water, and especially with advantage an aqueous alkaline solution, e.g., an aqueous solution of caustic soda or sodium carbonate, followed by removal of the solids portion to prepare a predominantly protein-containing extraction liquid. While the extraction of defatted soybeans which have been defatted at low temperatures may be effected by means of either water or hot water, usually the extraction is carried out with an aqueous alkali solution.

In extracting with an aqueous alkaline solution, the concentration and pH of the alkaline solution is not too critical. However, at below pH 9.5, the rate of extraction of the proteins becomes unsatisfactory. On the other hand, at above pH 13.5, the rate of extraction is good, but the proportion of the total nitrogen to glutamic acid [1] (glutamic acid/total nitrogen) changes (becomes low) and hence is not desirable. Therefore, a pH of 10–13, and especially in the neighborhood of 12, is suitable. Usually, the extraction is preferably carried out at a temperature ranging between about room temperature and about 70° C.

The concentration of this extraction liquid is preferably such that the total nitrogen concentration derived from said extraction liquid per 100 ml. of the liquid medium to be finally used is in a range between 0.5 and 2.5 grams, and particularly a range between 0.8 and 1.5 grams.

When a departure is made from this range, it becomes extremely difficult, if not impossible, to provide a liquid medium possessing a high concentration but low viscosity, which is a necessity in the practice of this invention.

The extraction liquid may, of course, be suitably diluted with water or concentrated, as required. Again, while the pH of the medium can also be adjusted at a much later stage, it is conveniently adjusted by adding to the extraction liquid, the known acids that are usually used to adjust the pH of a medium, for example, hydrochloric acid.

The purpose of adjusting the pH of the extraction liquid by means of such as hydrochloric acid is to make the pH of the liquid medium suitable for the culture of Aspergilli after addition of the carbohydrates thereto and its sterilization. While there is some difference depending upon the strain of the Aspergilli used, the class of the carbohydrates added and sterilization conditions, generally speaking, a pH in the neighborhood of 5 to 7.5 is best used, the choice being made so as to be most suitable for multiplying the Aspergillus mycelia and the production of the various enzymes.

As hereinbefore indicated, the medium to be used in this invention is prepared by incorporating one or more suitable carbohydrates therein. As these carbohydrates, included are such, for examples, as the saccharides e.g. dextrose and sucrose; the grains as wheat bran, wheat flour and crushed wheat; and the other starches. If desired, it is also possible to add those additives which are usually used in preparing synthetic media, such as organic and inorganic nitrogen sources, e.g., urea, ammonium sulfate and ammonium nitrate, or salts, e.g., potassium phosphate, sodium phosphate, sodium nitrate, magnesium sulfate, potassium chloride and iron sulfates. The class and amount of the carbohydrates and others to be added should be chosen from the standpoint of the maintenance of the high concentration but low viscosity of the liquid medium and also from the standpoint of the concentration in the aforesaid medium of total nitrogen derived from the extraction liquid. When the amount added of the carbohydrates is tool small, the nitrogen in the form of ammonia increases abnormally during the culture of Aspergilli, with the consequence that the pH rises to impair the flavor of the final product. On the other hand, the addition in large amounts of such solids as wheat, and particularly those containing much starch, renders the viscosity of the medium excessive. As this will make it difficult to use the usual culture tanks, this should be avoided. The concentration of the carbohydrates is suitably on the order of 1–10 grams per 100 ml. of the medium in the case of the saccharides such as dextrose, and on the order of 1–5 grams per 100 ml. of the medium in the case of the starchy materials such as crushed wheat.

In this invention, the so prepared liquid medium of high concentration but low viscosity, which has been adjusted to have a viscosity and pH making possible the submerged culture therein of Aspergilli, is inoculated with Aspergilli, and the submerged pure culture in liquid medium is carried out under aerobic conditions.

Normally, after the sterilizing treatment of the liquid medium, it is convenient to carry out the culture using a closed tank, but the culture can also be carried out using a suitable culture vessel in a sterile room which is maintained under conditions that the intrusion of other microorganisms is prevented. In short, the requirement is that the submerged culture in liquid medium be carried out under aerobic conditions and moreover under conditions wherein the intrusion of troublesome other microorganisms can be prevented. The culture is normally carried out at temperatures on the order of 20–40° C., and preferably 25–38° C.

The strain of Aspergilli used in this invention may be that which is usually used for preparing soy sauce, provided it is one which can be cultivated in a liquid medium. In fact, this is to be preferred when the flavor of the product is considered. Thus, it is not particularly necessary to choose and use those strains which are especially potent with respect to the production of protease and amylase by means of liquid culture.

Hence, according to this invention, those Aspergilli known in the soy sauce brewing art can be freely chosen and used. As such Aspergilli, those which are used most commonly are the fungi of the genus Aspergillus, particularly the yellow Aspergilli, and those referred to as conidia heads are green, blue-green or yellow and are fungi which do not form perithecia and ascospores [the classification in Thom and Raper, "Manual of the Aspergilli" (1945, William & Wilkins)]. Specifically, the following groups can be named:

(1) *Aspergillus flavus-oryzae* group,
(2) *Aspergillus ochraceus* group, and
(3) *Aspergillus tamarii* group.

---
[1] The glutamic acid, as here used, is not free glutamic acid but denotes the total glutamic acid which forms when the extraction liquid is hydrolyzed.

As examples of fungi belonging to the aforesaid *Aspergillus flavus-oryzae* group, included are *Aspergillus oryzae, Aspergillus sojae, Aspergillus oryzae* var. *microsporus, Aspergillus oryzae* var. *magnasporus,* etc. As examples of those belonging to the *Aspergillus ochraceus* group, included are *Aspergillus ochraceus, Aspergillus melleus, Aspergillus oniki,* etc. And as examples of those belonging to the *Aspergillus tamarii* group, included are *Aspergillus tamarii,* etc. However, Sakaguchi and Yamada (J. Agr. Chem. Soc. Japan 20 65 (1944)) differentiate these by the following classification:

(I) The *Aspergillus sojae* which has a small projection formed on its conidia and whose conidiophore wall is smooth, and (II) That of the *Aspergillus flavus-oryzae* group, which does not have a small projection on its conidia and whose conidiophore wall is rough.

However, since Thom and Raper holds that *Aspergillus sojae* belongs to the *flavus-oryzae* group, we wish to add that the fungi to be used in this invention comprehend any and all of those in accordance any of the foregoing classifications.

According to this invention, with the use of a liquid medium of high concentrations but low viscosity the culture of Aspergilli becomes exceedingly easy, and a culture liquid containing a large amount of Aspergillus mycelia can be obtained in a short period of, say, on the order of 24 to 150 hours. Then, according to this invention, the mycelia in the culture liquid is subjected to autolysis under conditions in which the intrusion of other microorganisms is prevented.

During the submerged pure culture of Aspergilli in a liquid medium under aerobic conditions in this invention, the concomitant production of protease and amylase naturally takes place. One of the most important as well as necessary aims in this invention is to produce the Aspergillus mycelia in a greater quantity and in high concentration by means of the submerged pure culture thereof in a liquid medium and then to cause the Aspergillus mycelia to autolyze. These are absolutely necessary conditions for increasing the formation of free glutamic acid and also for imparting to the product the flavor which is characteristic of brewed soy sauce. The reason why one must use the protein-containing materials after taking the trouble of extracting them with water or an aqueous alkaline solution is for making this process commercially feasible. Hence, the choice of the Aspergillus strain must also be made from this viewpoint.

For forming as great an amount of free glutamic acid as possible in a short period by causing the autolysis of the Aspergillus mycelia, this is accomplished by further continuance of the culture after the Aspergillus mycelia have fully multiplied, the culture being accompanied by aeration and agitation. However, if the aeration and agitation is continued for an overlong period, the nitrogen in the form of ammonia increases abruptly and impairs the flavor. Accordingly, the aeration and agitation is preferably stopped after a suitable period, after which the autolysis of Aspergilli is permitted to proceed with the culture liquid standing still and under conditions in which the intrusion of other microorganisms is prevented. In this case, the autolysis step may be carried out in situ after stopping the aeration and agitation, or the contents of the culture tank may be transferred to another sterilized closed vessel (which need not be provided with aeration and agitation means) where the autolysis step may be carried out. Thus, a seasoning having a full-bodied and characteristic aroma and flavor is prepared.

Autolysis is carried out at a temperature on the order of 10–40° C., and usually on the order of 15–38° C. However, in those cases where much time may be expended for this operation, temperatures which are considerably low can also be used. Normally, autolysis proceeds even during the culture period but, as the autolysis step after completion of the culture, a period on the order of 24 hours to 10 days is employed. If desired, the autolysis step may however be carried out over a prolonged period on the order of three weeks.

Normally, it is preferred that this autolysis-completed culture liquid is used after removing therefrom the solids portion, which still is present therein to a certain extent, but it can also be used blended in its as-obtained state with other seasonings. The most usual practice is to add after removal of the solids portion, in a suitable amount a salty taste agent suitably chosen from such as common salt, potassium chloride, sodium malate or potassium malate. Of course, those treatments in accordance with customary practice for preventing the growth of fungi, as usually practiced, such as heating or the addition of antifungal agents, may also be carried out. Depending upon the class of the salty taste agent and its quantity or the combinations thereof, a seasoning containing common salt as contained in the usual soy sauce, or the so-called non-salt or salt-reduced soy sauce can be prepared as desired.

Thus, in accordance with the invention method, the following commercially important advantages accrue.

(1) The defects of the hereinbefore noted improved method which uses a pastelike medium, as proposed previously, are surmounted, and the uniform and active multiplication culture of Aspergilli becomes readily carried out. A great quantity of Aspergillus mycelia can be obtained in a short period of time, and the production of such enzymes as protease and amylase become active. Moreover, no special equipment is required, the usual culture tanks being sufficient.

(2) Further, as compared with the other proposed improvement which consisted principally of cultivating the Aspergilli using a liquid medium whose concentration of the starting materials is low to obtain an enzymatic liquid followed by decomposing the materials with this Aspergillus-produced enzymatic liquid, a greater amount of free glutamic acid is formed by the invention method. Again, when the free glutamic acid per total nitrogen (free glutamic acid/total nitrogen) is also compared, a product can be obtained in accordance with the invention method which is by no means inferior to the usual brewed soy sauce obtained by the solid koji method.

(3) The principles involved in the preparation of brewed soy sauce, i.e., the multiplication of the Aspergilli in the culture medium (soy sauce starting materials) containing proteins and carbohydrates, followed by the conjoint effecting of the enzymatic decomposition of the substrate (starting materials) and the autolysis of the Aspergillus mycelia, are carried out without change in the method of this invention. Thus, its product fully possesses the flavor essentially possessed by soy sauce, a characteristic which was lacking in the conventional soylike seasoning such as the so-called "amino acid soy sauce," which was prepared by the method of decomposition with hydrochloric acid and neutralization with an alkali. Further, the soy sauce of this invention does not have such offensive odors which evolve during decomposition by means of hydrochloric acid. Again, when carrying out the subsequent fermentation by means of such as soy yeasts as a means of improving the flavor, there is no formation of fermentation-impeding substances attributable to the decomposition of the starting materials by means of hydrochloric acid. Hence, the fermentation is easily carried out in the present invention, with the consequence that a product can be obtained whose quality excels that obtained by the method wherein decomposition by means of hydrochloric acid is used.

(4) A dilute alkaline solution is also used during the extraction of the proteins by means of the invention method, and hydrochloric acid, etc., is also used thereafter for adjusting the pH so that it would be suitable for the cultivation of Aspergilli, but the alkali and acid are only used for making the pH suitable for the respective processing steps and are not intended to be used for decomposing the materials. Thus, the amount of alkali or acid used suffices with a much smaller amount than that in the case of the method consisting of decomposing with hydrochloric acid and neutralizing with an alkali.

(5) According to the invention method, the protein containing materials are liquefied by the extraction. Thus, even after the addition of the other materials, the whole mixture is of a viscosity low enough to be handled as a liquid. Moreover, its components are contained in a high concentration, and multiplication of the Aspergilli is carried out actively. In addition, the transportation in the plant of the material being processed and the automatic temperature control during the cultivation of Aspergilli are much easier than in the case of the conventional method of brewing soy sauce where solid koji is used. Hence, it becomes possible to accomplish a marked reduction in the labor required during the koji making step.

(6) Again, for the same reason, in the invention method the solids contents of the matured soy mash is far less than that of the number of improved methods hereinbefore described, not to mention the conventional method of using solid koji. As a result, the soy mash pressing step is also greatly simplified, with the consequence that the mechanization and rationalization of the pressing step to a still higher degree can be expected.

(7) Further, since the pure culture of Aspergilli is carried out under conditions where the intrusion of other microorganisms is prevented and hence no contamination by other microorganisms occurs, a major portion of the enzymatic decomposition of the starting materials and the autolysis of the Aspergillus mycelia can be carried out in the absence of common salt. Consequently, the production period is shortened very greatly as compared with that when soy sauce is brewed by means of solid koji.

The aroma and flavor of the autolysis-completed culture liquid can be enhanced still more and also the formation of such components as alcohol and glycerine can be increased by adding thereto, as required, a suitable amount of solid koji, preferably in a state wherein the solids portion has not been removed from the liquid, followed by fermenting with soy lactic acid bacteria and soy yeasts, in the presence of common salt. In this manner, a soylike seasoning having an aroma and flavor very similar to the characteristic aroma and flavor which had been only obtainable by the disadvantageous solid koji preparation method can be obtained.

A fermentation temperature on the order of 15–37° C., and usually on the order of 20–35° C., can be employed. Preferably, a temperature of about 27–30° C. is used. There is no particular restriction as to the period of fermentation, but usually a period of 1–3 months is used. It is, of course, possible to use a shorter period, or if desired, a longer period.

For this purpose, common salt in a suitable amount (normally 10–20 grams per 100 ml. of the culture liquid) is added to the autolysis-completed culture liquid, then after transferring the liquid to, say, an open tank, a suitable amount of solid koji is added, after which soy lactic acid bacteria and soy yeasts are added and the liquid is fermented, whereby a matured mash having a flavor characteristic of brewed soy sauce can be obtained.

The starting material of the solid koji to be added in this case consists principally of wheat or wheat bran considering the end to be attained, but a part may consist of defatted soybeans or materials such as copra meal.

The treatment of the starting materials and conditions of preparation of the koji are those customarily practiced. Alternatively, instead of adding the previously cultured soy lactic acid bacteria or soy yeasts, a small amount of the customary soy mash containing such microorganisms may be added as a seed soy mash.

This fermentation, which is carried out by means of soy lactic acid bacteria and soy yeasts, is carried out in the presence of common salt, which can be added either at the beginning or at a suitable time during the progress of the fermentation. Further, if desired, the autolysis-completed culture liquid can be fermented with lactic acid bacteria and yeasts, in the absence of common salt and under conditions wherein the intrusion of other microorganisms is prevented, after which at least a salty taste agent is added.

The soy lactic acid bacteria and soy yeasts used in the fermentation step are those microorganisms which are known in the art of soy sauce preparation. These lactic acid bacteria may be any which range from those which are salt tolerant to halophilic and anaerobic to microaerophilic, which can form lactic acid and can assist the growth of the yeasts and ripen the soy sauce aroma and flavor. Included are, for example, Pediococcus, Lactobacillus, Streptococcus, Tetracoccus, etc. Depending upon the lactic acid bacteria, there are some which perform homofermentation while there are some which perform heterofermentation. Either can be used.

One of the bacteria most commonly used in brewing soy sauce is exemplified by *Pediococcus soyae*. According to the classification of Nakagawa & Kitahara (J. Gen. Application Microbiol. 5 95 (1957)) said *Pediococcus soyae* is held to be a variety sp. of *Pediococcus halophilus* MEES (1934).

Further, the soy yeasts such as noted hereinbefore are also well known in the art. These yeasts possess osmophilic property, are salt tolerant or halophilic and usually possess sugar tolerance. Preferably it is those which can carry out fermentation of such as alcohol in the presence of above 15% of common salt. There are those of these yeasts which belong to either the family Endomycetaceae or the family Cryptococcaceae in accordance with the classification of yeasts, in Rodder & Kreger, Van Rij, "The Yeasts, A Taxonomic Study." Examples of those belonging to Endomycetaceae include such as *Saccharomyces rouxii* and *Saccharomyces acidifaciens*. *Saccharomyces rouxii* have comprehended those microorganisms which were referred to as *Zygosaccharomyces soyae*, *Zygosaccharomyces major*, *Zygosaccharomyces sulsus*, etc., and osmophilic Zygosaccharomyces. Those belonging to Cryptococcaceae include the genus Torulopsis yeasts such as *Torulopsis versatilis*, *Torulopsis sphaerica*, *Torulopsis sake*, *Torulopsis halophilus*, etc. These yeasts may be used either singly or in combination according to this invention.

These known soy yeasts can be used in this invention. Further, when the fermentation step is to be carried out in the absence of common salt, the other known yeasts are also useable.

Thus, in accordance with one mode of this invention, a method of preparing a soylike seasoning can be provided, which comprises leaching with an aqueous alkaline solution of such as caustic soda or sodium carbonate, beans, such as soybean and defatted soybean, or materials containing in large amounts proteins such as gluten, eihter in their whole state or after having been flattened or crushed, to obtain an extraction liquid containing a large amount of proteins, adjusting this extraction liquid with an acid such as hydrochloric acid to a pH suitable for cultivation of Aspergilli, adding to this extraction liquid in its as-obtained state or after changing its concentration suitably by diluting with water or concentrating, one or more carbohydrate materials consisting of the saccharides such as dextrose and sucrose, the grains such as wheat bran, crushed wheat and wheat flour, or the starches, adding, as required, nitrogen sources and salts consisting of organic or inorganic materials, thus making a liquid medium having a concentration and viscosity on the order such that the whole thereof can be managed as a liquid, placing this in a closed tank, then after sterilization thereof, inoculating it with Aspergilli, carrying out the pure culture thereof while performing aeration and agitation, thereby making a culture liquid containing a large amount of Aspergillus mycelia, then effecting the autolysis of Aspergillus mycelia in the closed vessel while preventing the intrusion therein of other microorganisms, followed by removing the solid matter from the autolyzed liquid, and thereafter completing the preparation of the seasoning by adding a suitable salty taste agent such as common salt, potassium chloride, potassium malate or sodium malate, or without adding such an agent.

Further, according to another mode, a method of preparing soy sauce can be provided which comprises adding a suitable amount of common salt to the aforesaid autolyzed Aspergilli liquid after having completed the autolysis, followed by transferring the liquid to an open tank, adding a suitable amount of solid koji as required, and thereafter carrying out the fermentation step while taking steps to improve the aroma and flavor by adding also either separately cultivated soy lactic acid bacteria and soy yeasts or a small amount of separately cultivated conventional soy mash as a seed soy mash, thereby obtaining the matured soy-mash.

The following examples are given for illustrating several modes of practicing the present invention.

EXAMPLE 1

Three kg. of defatted soybeans were leached with 0.1 N caustic soda solution while maintaining a pH of 12–13, after which the solids portion was removed, and then by adjusting the pH to 6 using hydrochloric acid about 15 liters of a pH adjusted protein extraction liquid (total nitrogen concentration 1.387 grams/100 ml.) were obtained.

After adding 450 grams of crushed wheat to this liquid, it was placed in a culture tank having a total capacity of 30 liters, and it was sterilized with steam for 40 minutes at 2 kg./cm.$^2$ (gauge).

After cooling *Aspergillus oryzae* var. *microsporus* R96V was inoculated, and the culture was carried out for 96 hours at 30° C. with aeration and agitation. Then after adding common salt such that its concentration would become 17%, the culture liquid was transferred to an open tank, maintained at room temperature for 15 days, followed by filtering to yield about 15 liters of a soylike seasoning.

An example of its analysis is as follows:

Total nitrogen _____g./100 ml__ 1.429
Nitrogen in amino form _____g./100 ml__ 0.674
Nitrogen in ammonia form _____g./100 ml__ 0.145
Free glutamic acid _____mg./ml__ 12.72
pH _____ 6.10
Common salt _____g./100 ml__ 16.95

EXAMPLE 2

6.8 kg. of wheat gluten were dissolved in 0.1 N caustic soda solution, after which the solution was adjusted to pH 7 with hydrochloric acid to obtain about 60 liters of a pH adjusted extraction liquid (total nitrogen concentration 1.250 grams/100 ml.) containing some floating coagulated materials. After adding 1.2 kg. of dextrose to this liquid, it was placed in a culture tank having a total capacity of 100 liters, followed by sterilizing thereof with steam for 25 minutes at 1.2 kg./cm.$^2$ (gauge). After cooling, the liquid was inoculated with *Aspergillus sojae* K.S., and the culture was carried out for 72 hours at 30° C. with aeration and agitation, following which the cultured liquid was transferred to a sterilized closed vessel having a total capacity of 75 liters. Here the autolysis of the culture liquid was carried out for 7 days while standing still. After filtering the liquid, common salt, potassium chloride and potassium malate were added to the liquid in such amounts as to become concentrations of respectively 8, 2 and 3 grams per 100 ml. Thus was obtained a salt-reduced soylike liquid seasoning in an amount of about 60 liters.

An example of its analysis is as follows:

Total nitrogen _____g./100 ml__ 1.215
Nitrogen in amino form _____g./100 ml__ 0.594
Nitrogen in ammonia form _____g./100 ml__ 0.206
Free glutamic acid _____mg./ml__ 16.99
pH _____ 6.12

EXAMPLE 3

99 kg. of defatted soybeans were subjected to a counter-current multiple stage extraction with 0.1 N caustic soda solution, following which the extraction liquid was adjusted to pH 6.5 with hydrochloric acid to obtain 450 liters of a liquid whose total nitrogen concentration was 1.490 g./100 ml. 9 kg. of dextrose were added to this liquid, then the liquid was placed in two culture tanks having a total capacity of 400 liters, and both were sterilized with steam for 30 minutes at 1.8 kg./cm.$^2$ (gauge). After cooling, the liquids were inoculated with *Aspergillus sojae* K.S. mutant X–816. After carrying out the culture for 72 hours at 30° C. with aeration and agitation, the aeration and agitation was stopped, and the culture liquids were left standing still in the tanks for another 48 hours, thereby carrying out the autolysis. Then after adding common salt in an amount such that the concentration thereof would become 17.5 g./100 ml., the liquids of the two tanks were transferred to an open tank (wooden tank for soy mash use and having a total capacity of 700 liters). Solid koji separately prepared from 84 kg. of wheat was then added to the liquids, to which were also added separately pure-cultured soy lactic acid bacteria *Pediococcus soyae* and a soy yeast *Saccharomyces rouxii*, after which the fermentation was carried out at 27–29° C. 45 days later, about 520 liters of matured soy mash was obtained, which was pressed in accordance with customary procedures and raw soy sauce was obtained.

When the analysis values of the so obtained soy sauce were compared with that obtained by the customary solid koji method, the control, they were as follows:

| | Total Nitrogen, g./100 ml. | Nitrogen in Amino Form, g./100 ml. | Nitrogen in Ammonia, g./100 ml. | Free Glutamic Acid, mg./ml. | Common Salt, g./100 ml. | Reducing Sugar, g./100 ml. | Alcohol, vol. Percent | pH |
|---|---|---|---|---|---|---|---|---|
| Invention method | 1.640 | 0.881 | 0.268 | 16.25 | 17.35 | 5.25 | 2.50 | 4.72 |
| Control | 1.714 | 0.878 | 0.261 | 14.23 | 17.20 | 4.70 | 1.40 | 4.71 |

EXAMPLE 4

300 kg. of defatted soybeans were subjected to a counter-current multiple stage extraction with 0.1 N caustic soda solution, following which the extraction liquid was adjusted to pH 6 with hydrochloric acid to obtain 1.5 kiloliters of liquid having a total nitrogen concentration of 1.360 g./100 ml. After adding 40 kg. of crushed wheat to this liquid, it was placed in a culture tank having a total capacity of 3 kiloliters, followed by sterilizing with steam for 45 minutes at 2 kg./cm.$^2$ (gauge). After cooling, *Aspergillus sojae* K.S. was inoculated, and the culture was carried out for 72 hours at 28–32° C. with aeration and agitation. Then the contents were transferred to a sterilized closed vessel (total capacity 1.8 kiloliters) and left standing still for a period of about 4 days. Thereafter, the contents were transferred to a concrete tank for soy mash use (open, total capacity 2.4 kiloliters), followed by addition of common salt such that the concentration thereof would become 18 g./100 ml. Solid koji separately prepared from 260 kg. of materials consisting of defatted soybeans and wheat in a ratio of 3:7 was then added and also as the seed soy mash were added 85 liters of conventional natural brewed soy mash whose period after charging was 2 months. Thus, after carrying out the fermentation for about 2 months at 28° C., about 1.75 kiloliters of matured soy mash were obtained.

The analysis of the soy mash filtrate was as follows:

| | |
|---|---|
| Total nitrogen _____ g./100 ml__ | 1.520 |
| Nitrogen in amino form _____ g./100 ml__ | 0.740 |
| Nitrogen in ammonia form _____ g./100 ml__ | 0.165 |
| Free glutamic acid _____ mg./ml__ | 15.05 |
| pH _____ | 4.8 |
| Common salt _____ g./100 ml__ | 17.85 |
| Reducing sugar _____ g./100 ml__ | 2.78 |
| Alcohol _____ vol. percent__ | 3.21 |

We claim:

1. A method of preparing a seasoning which comprises inoculating with a pure Aspergilli culture a liquid medium containing at least carbohydrates and an extraction liquid containing predominantly proteins, said liquids having been obtained by extracting vegetable protein-containing materials with a member selected from the group consisting of water and aqueous alkaline solutions, the concentration of total nitrogen in said medium derived from said extraction liquid being 0.5–2.5 grams per 100 milliliters of the medium, the pH and viscosity of said medium having been adjusted so as to render possible the submerged culture in liquid medium of Aspergilli, effecting the submerged pure culture in liquid medium of said Aspergilli under aerobic conditions to obtain a culture medium containing a large quantity of Aspergillus mycelia, and thereafter effecting the autolysis of said mycelia under conditions wherein the intrusion of other microorganisms is prevented.

2. The method of claim 1 wherein the concentration of total nitrogen in said liquid medium is 0.8–1.5 grams per 100 milliliters.

3. The method of claim 1 wherein the pH of the liquid medium is in the range of 5.0 to 7.5.

4. The method of claim 1 which comprises removing the solids from said autolysis-completed culture liquid and blending therein at least a salty taste agent.

5. The method according to claim 1 wherein said autolysis-completed culture liquid is fermented with lactic acid bacteria and yeasts in the absence of common salt under conditions wherein the intrusion of other microorganisms is prevented, and at least a salty taste agent is blended therein after completion of the fermentation.

6. The method according to claim 1 wherein said autolysis-completed culture liquid is fermented with lactic acid bacteria and yeasts isolated from soy mashes in the presence of common salt.

7. The method according to claim 6 wherein said fermentation is effected in said autolysis-completed culture liquid to which has been added solid koji.

8. The method according to claim 6 wherein said fermentation is effected by adding to said autolysis-completed culture liquid said lactic acid bacteria and said yeasts in the form of the known soy mash.

References Cited

UNITED STATES PATENTS

| | | | |
|---|---|---|---|
| 1,514,554 | 11/1924 | Matsuoko | 99—145 |
| 2,967,108 | 1/1961 | Smith et al. | 99—145 |

RAYMOND N. JONES, Primary Examiner

WILLIAM A. SIMONS, Assistant Examiner